(12) United States Patent
Kahle et al.

(10) Patent No.: US 7,470,068 B2
(45) Date of Patent: Dec. 30, 2008

(54) COUPLING FOR OPTICAL-FIBER CONNECTORS

(75) Inventors: Eberhard Kahle, Berlin (DE); Anne Kramer, Berlin (DE); Jörg Adomeit, Berlin (DE)

(73) Assignee: ADC GmbH, Berlin (DE)

( * ) Notice: Subject to any disclaimer, the term of this patent is extended or adjusted under 35 U.S.C. 154(b) by 0 days.

(21) Appl. No.: 10/513,243

(22) PCT Filed: Apr. 25, 2003

(86) PCT No.: PCT/EP03/04293

§ 371 (c)(1), (2), (4) Date: Sep. 1, 2005

(87) PCT Pub. No.: WO03/093889

PCT Pub. Date: Nov. 13, 2003

(65) Prior Publication Data

US 2006/0083468 A1    Apr. 20, 2006

(30) Foreign Application Priority Data

May 3, 2002    (DE) .............................. 102 19 892

(51) Int. Cl.
*G02B 6/36* (2006.01)
(52) U.S. Cl. .......................................... 385/58; 385/70
(58) Field of Classification Search ................. 385/58, 385/70, 73, 75
See application file for complete search history.

(56) References Cited

U.S. PATENT DOCUMENTS

| | | | |
|---|---|---|---|
| 4,277,135 A | 7/1981 | Schrott et al. | |
| 4,767,179 A | 8/1988 | Sampson et al. | |
| 5,104,242 A | 4/1992 | Ishikawa | |
| 5,329,604 A | 7/1994 | Baldwin et al. | 385/92 |
| 5,363,460 A | 11/1994 | Marazzi et al. | 385/70 |
| 5,606,161 A | 2/1997 | Schulz | 250/239 |
| 5,708,745 A | 1/1998 | Haga et al. | |
| 5,923,805 A | 7/1999 | Anderson et al. | |
| 6,039,585 A * | 3/2000 | Kim et al. | 439/137 |
| 6,206,577 B1 | 3/2001 | Hall, III et al. | 385/53 |
| 6,375,363 B1 | 4/2002 | Harrison et al. | |
| 6,461,054 B1 | 10/2002 | Iwase | 385/73 |

(Continued)

FOREIGN PATENT DOCUMENTS

CN    122 111 7 A    12/1998

(Continued)

*Primary Examiner*—Kevin S Wood
*Assistant Examiner*—Jerry T Rahll
(74) *Attorney, Agent, or Firm*—Merchant & Gould P.C.

(57) ABSTRACT

A coupling (1) for receiving at least two plug-in connectors (2) which are joined to glass fiber cables, comprising at least one moveable cover (14) which is associated with a sheath opening (121), said cover covering the opening (121) of the sheath in a first position, and being able to be moved into a second position by introducing a plug-in connector (2), whereupon the cover (14) releases the opening (121) in the sheath, said cover (14) comprising a bent metallic leaf spring (141) and said leaf spring (141) being unstressed in the first position and the curvature of the leaf spring (141) being selected in such a way that a ferrule (23) of the plug-in connector (2) never comes into contact with the leaf spring (141) during the insertion process.

18 Claims, 5 Drawing Sheets

U.S. PATENT DOCUMENTS

| | | | |
|---|---|---|---|
| 6,688,780 B2 * | 2/2004 | Duran | 385/76 |
| 6,709,165 B2 | 3/2004 | DeMarchi | 385/55 |

FOREIGN PATENT DOCUMENTS

| | | |
|---|---|---|
| DE | 43 30 212 | 3/1995 |
| DE | 101 39 670 | 4/2002 |
| EP | 0 599 784 | 6/1994 |
| EP | 0 610 676 | 8/1994 |
| EP | 0 788 002 | 8/1997 |
| EP | 1 271 204 | 1/2003 |
| JP | 2001-194562 | 7/2001 |
| JP | 2002-016350 | 1/2002 |
| JP | 2002-116350 | 4/2002 |
| WO | 94 18586 | 8/1994 |
| WO | 99 40466 | 8/1999 |

* cited by examiner

COUPLING FOR OPTICAL-FIBER CONNECTORS

The invention relates to a coupling for accommodating plug-in connectors according to the preamble of patent claim 1.

It is known for optical fibers to be connected coaxially to plug-in connectors by means of couplings. The plug-in connectors are designed with a ferrule at the free end for the purpose of central fixing. The two ferules of the plugs which are to be connected can be introduced into a sleeve of the corresponding coupling, the ferrules coming into contact at the end surfaces. The sleeve is mounted in a sleeve mount. The outer shape of the coupling housing is defined by way of the given geometries of a known installation opening. Light waves are transmitted by fiber-optic cables. In order to prevent the emission of harmful laser radiation when the plug is subjected to pulling on one side, a protective device is necessary.

A coupling with a protective device is known, for example, from EP 0 599 784 A1, there being arranged in front of the sleeve opening, as seen in the plug-in direction, a moveable protective flap which, in a closed position, at least partially overlaps the sleeve opening and, in order for the contact pin to be plugged in, can be moved into an open position, the device having an inner bushing housing which can be pushed into an outer bushing housing, and the protective flap being retained, and mounted pivotably, between the two bushing housings. The disadvantage with such a protective device is the amount of space taken up by the pivoting mechanism, with the result that it cannot be realized with small outer dimensions of the coupling. In addition, the high-outlay mechanism is cost-intensive to produce.

The invention is thus based on the technical problem of providing a coupling which is intended for accommodating plug-in connectors connected to fiber-optic cables and which, with small outer dimensions of the coupling, provides protection against the emission of harmful laser radiation and can be produced cost-effectively.

The problem is solved by the subject matter having the features of claim 1. Further advantageous configurations of the invention can be gathered from the subclaims.

The emission of harmful laser radiation from a sleeve opening of a plug receptacle can be prevented by a covering assigned to the same, the covering comprising a bent metallic leaf spring which, in a first, non-loaded position, covers the sleeve opening and, by the introduction of a plug into the plug receptacle, can be moved into a second position, the sleeve opening being free in the second position, and the bending of the leaf spring being selected such that the ferrule does not come into contact with the leaf spring at any point in time during the plug-in operation. The leaf spring is to be selected here such that there is no need for any unnecessary application of force for the plug-in operation, and pronounced loading of the plug on account of the force of the leaf spring in the plugged-in state is avoided. At the same time, the elasticity of the leaf spring ensures that, when the plug is subjected to pulling, reliable return into the non-loaded position takes place. A metallic covering of the sleeve opening is distinguished by good thermal stability. Moreover, the metallic leaf spring allows a very thin configuration of the covering, although the sleeve opening is shielded to good effect. Even colored plastic flaps for covering the sleeve opening require a considerably thicker configuration. In order, in this case, not to obstruct the plug from being accommodated by the covering, a change in the outer shape of the coupling housing is necessary. Changes in the outer shape, however, are undesirable for the purpose of ensuring compatibility with the standard or that further couplings can be added on in a compact manner.

In a preferred embodiment, the covering is formed integrally with a leaf spring and two wings. Via the wings, the covering can be attached tangentially to a housing wall, the movement of the leaf spring being disrupted as little as possible by this attachment. The wings here are limited by the maximum outer dimensions of the coupling.

In one development, the means for accommodating the covering is designed as a separate connection piece which can be connected to the coupling housing. This makes it possible for the connection piece and the coupling housing to be produced separately. This is advantageous since, for example, the material can be selected in accordance with the respective requirements. It is also conceivable for couplings to be used in situations where they do not require any protective device against the emission of laser light. A two-part configuration of the protective device and of the coupling housing allows specific use of the protective device. A single-piece embodiment, however, is more stable and may thus be necessary for specific applications.

In one embodiment, the covering is fastened tangentially to the housing wall by hot stamping. The hot-stamping attachment can be realized cost-effectively. In addition, it is possible to produce the attachment both in the case of a single-piece configuration and in the case of a two-part configuration of the coupling housing and of the connection piece from plastic.

In a preferred embodiment, the connection piece is designed as a plastic part, it being possible for the covering to be connected to the connection piece by injection-molding encapsulation. This makes it possible to realize very good attachment of the covering to the connection piece.

In a further embodiment, the connection piece is designed as a separate sheet-metal part, the covering, configured as a leaf spring, being integrated in the sheet-metal part. Various methods such as spot welding or adhesive bonding are conceivable for attaching the leaf spring to the connection piece. The configuration of the connection piece as a sheet-metal part provides a higher stability than a plastic configuration.

In one development, the connection piece is formed integrally with the covering. This development is distinguished by particular stability.

In a preferred embodiment, the connection piece is attached to the coupling housing by a latching fastening. A latching fastening is advantageous since, on the one hand, automated installation can easily be realized but, on the other hand, it is also possible to provide a releasable connection. This makes it possible for the couplings to be adapted specifically to the respective use.

In a further embodiment, the connection piece is designed, for secure attachment, with centering pins.

The invention is explained in more detail hereinbelow with reference to a preferred exemplary embodiment. In the figures, schematically in each case.

Figure 1:
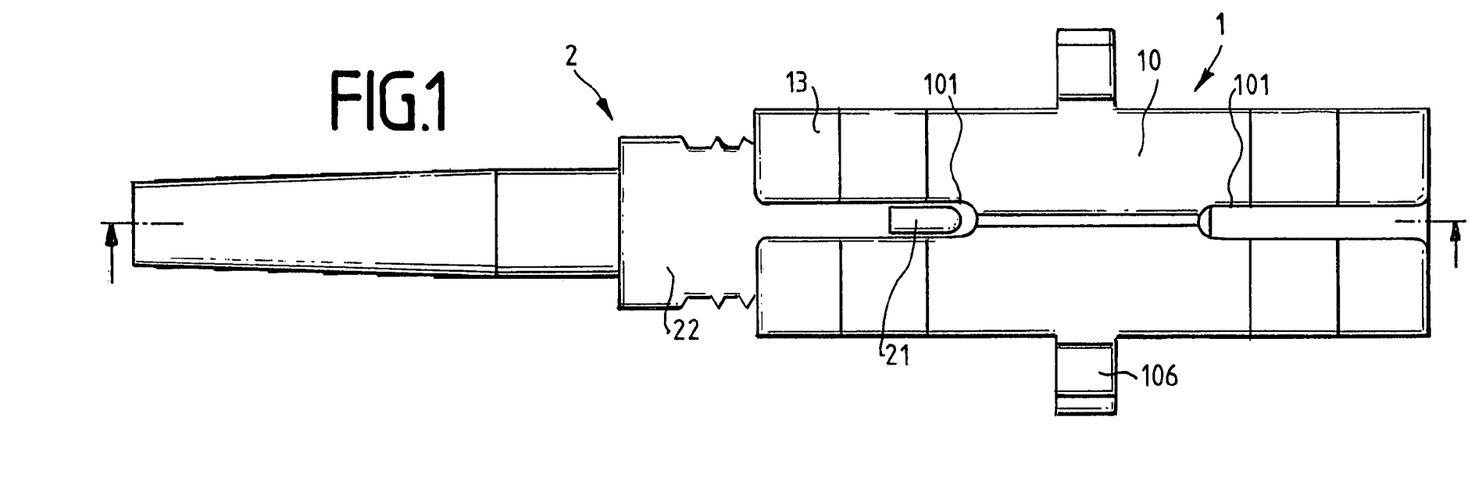
FIG. 1 shows a plan view of a coupling for coaxial optical-fiber connection and of a plug-in connector.

FIG. 1 shows, schematically, a coupling 1 for the coaxial connection of fiber-optic cables. The coupling comprises a coupling housing 10 into which a plug-in connector 2 can be plugged in from each end. The coupling housing 10 is designed with flanges 106, by means of which the coupling 1 can be attached to an installation opening (not illustrated). A connection piece 13 can be latched onto the coupling housing 10. The length of the connection piece 13 may be selected here such that there is no blockage of access to the grip region 22 provided on the plug-in connector 2 in the plugged-in state. The plug-in connector 2 is designed, for assisting guidance in the coupling housing 10, with a tongue 21, which can be introduced into a complementary groove 101 on the coupling housing 10 and into a groove 131 on the connection piece 13.

Figure 2:
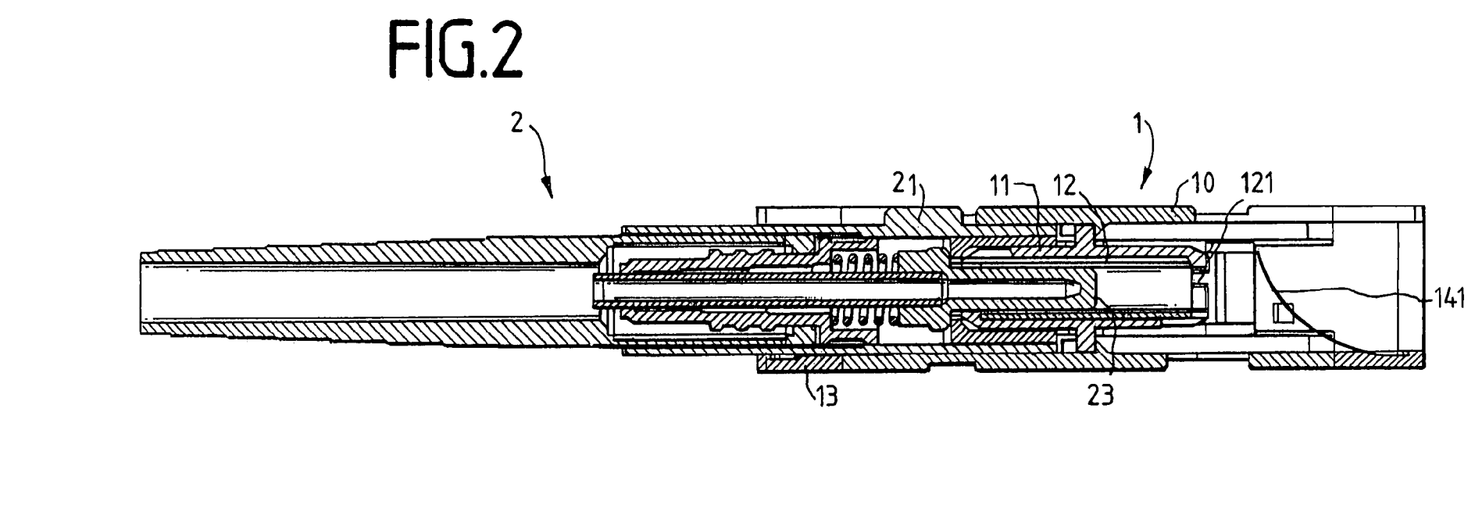
FIG. 2 shows a section through the plan view shown in FIG. 1.

FIG. 2 shows a section through the coupling 1 and the plug-in connector 2. The designations here correspond to FIG. 1. A sleeve mount 11 with a sleeve 12 is mounted in the coupling housing 10. The plug-in connector 2 is designed with a ferrule 23 at its free end. Two plug-in connectors 2 which are to be connected come into contact in the sleeve 12 via the end surfaces of the ferrules 23, with the result that light waves can be transmitted via the fiber-optic cables formed with the plug-in connectors 2. With a plug-in connector 2 plugged in on one side, the emission of light waves from a sleeve opening 121 has to be prevented. For this purpose, the sleeve opening 121 can be covered via a leaf spring 141. The leaf spring 141 may be selected to be very thin, with the result that, with the plug-in connector 2 placed in position, said spring is in close abutment in a depression of the housing wall and does not obstruct the plug-in connector 2 from being accommodated.

Figure 3:
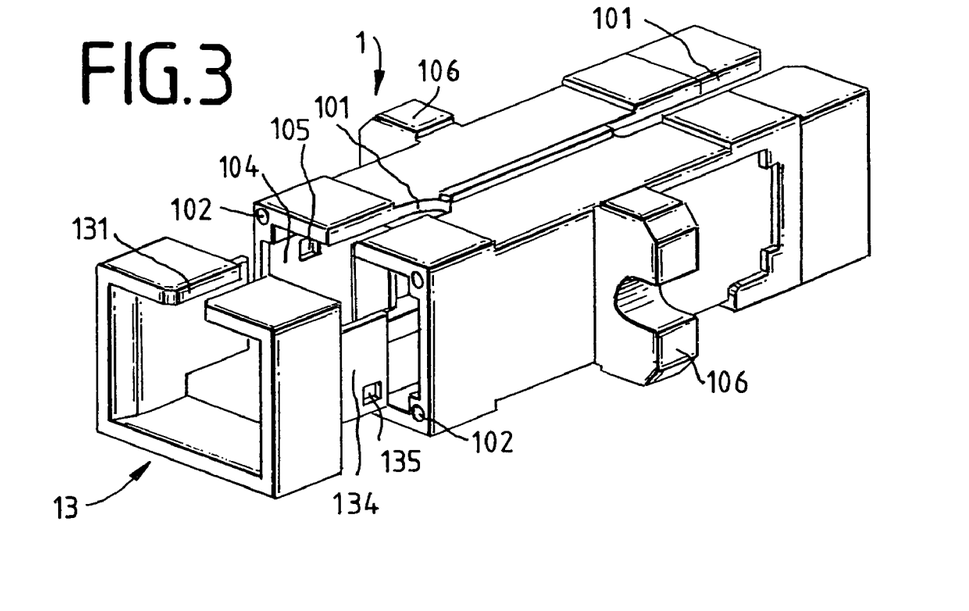
FIG. 3 shows a perspective illustration of a coupling housing and of a connection piece.

FIG. 3 shows a perspective illustration of the coupling 1. The designations here correspond to FIGS. 1 and 2. The connection piece 13 can be latched onto the coupling housing 10. For the latching fastening, the connection piece 13 is designed with latching tongues 134, which have through-passages 135. The coupling housing 10 is designed, on the contact surfaces 104 of the latching fastening, with latching noses 105, which latch into the through-passages 135. The connection piece 13 does not change the width and depth of the coupling 1, with the result that the tasks of attaching the coupling to a front panel (not illustrated) and of adding on further couplings are not adversely affected. It is also possible, in principle, for the connection piece 13 to be designed with latching noses and the coupling housing 10 to be designed with through-passages.

Figures 4, 5:
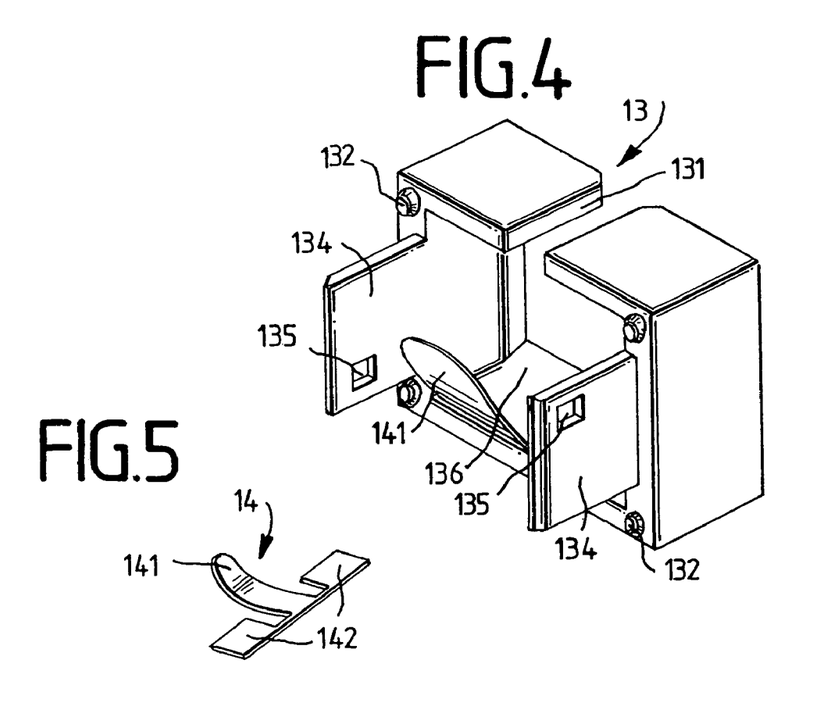
FIG. 4 shows a perspective illustration of the connection piece.
FIG. 5 shows a perspective illustration of a covering.

FIG. 4 shows the connection piece 13 schematically. The designations here correspond to FIGS. 1 to 3. The connection piece 13 may be attached to the coupling housing 10 (not illustrated) by means of centering pins 132, which engage in complementary bores 102 (see FIG. 3) in the coupling housing 10. The through-passages 135 and the complementary latching noses 105 are offset vertically in relation to one another. This makes it possible for the latching noses 105 to be formed straightforwardly in the coupling housing 10, which is illustrated in FIG. 1. However, other shapes and arrangements of the latching noses 105 are conceivable. It is also conceivable for the latching tongues 134, rather than extending over the entire width of the connection piece 13, only to cover a region around the latching noses 105 in each case. Additional latching fastenings on the two remaining side surfaces are likewise conceivable. However, an additional latching fastening must not conceal the groove 131, which is provided for orienting and/or positioning the plug-in connectors 2, or obstruct the movement of the leaf spring 141, which is provided tangentially to the side surface 136. The latching fastening illustrated, comprising two latching tongues on mutually opposite housing walls, is thus particularly advantageous.

FIG. 5 shows a covering 14 designed with leaf spring 141 and wings 142. The covering 14 is attached to the coupling 1 by means of the wings 142. The size of the wings 142 here is limited by the outer dimensions of the coupling 1. In principle, however, it is also possible for the leaf spring 141 to be attached directly via a tangential extension of the leaf spring.

Figure 6A:
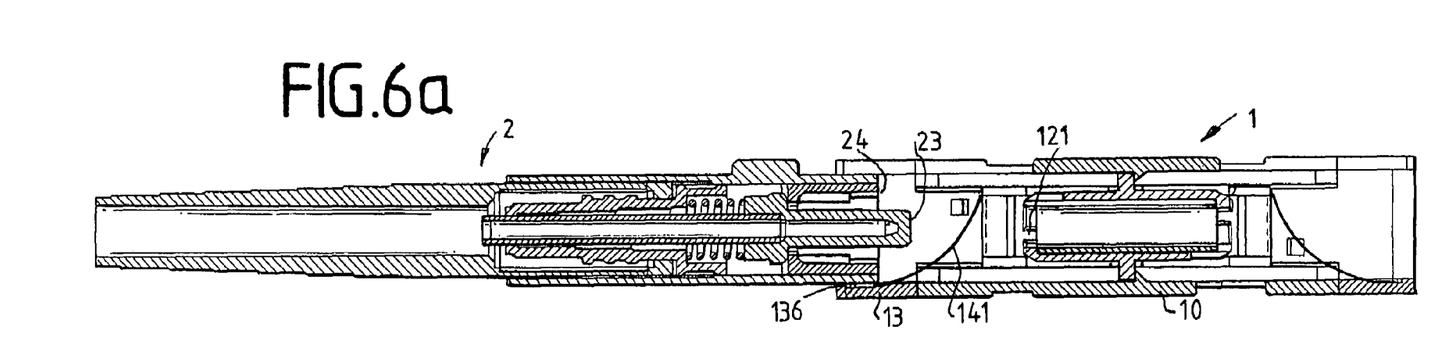
FIGS. 6(a)-(c) show sectional illustrations of the coupling and of the plug-in connector during the plug-in operation.
Figure 6B:
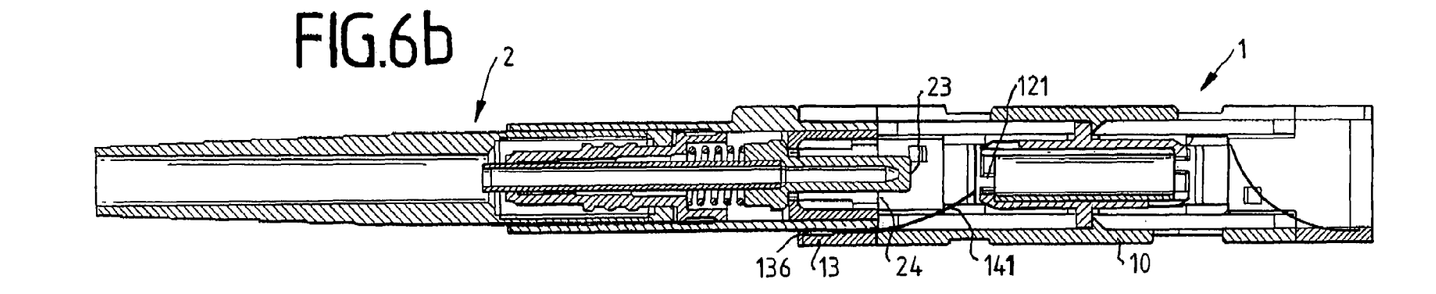
Figure 6C:
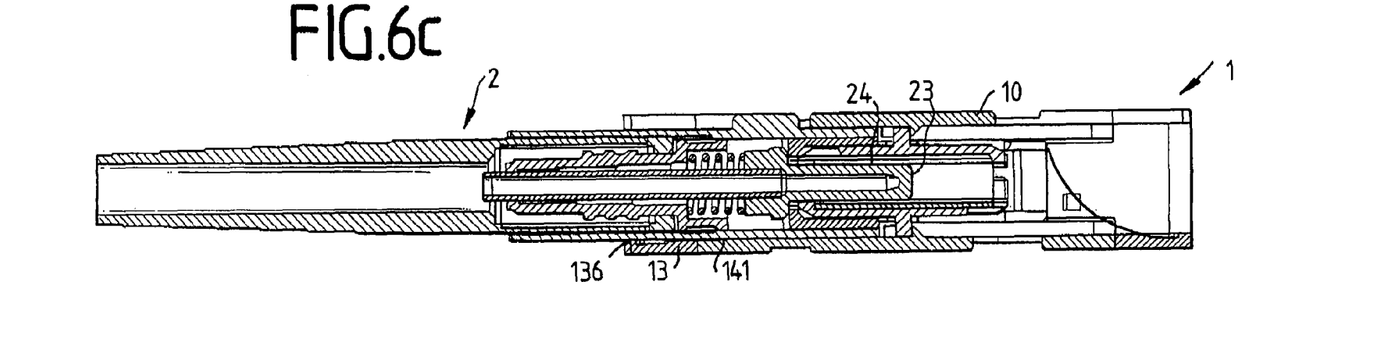

FIGS. 6(a)-(c) show, schematically, different points in time during a plug-in process. FIG. 6(a) shows the beginning of the plug-in process. At this point in time, the leaf spring 141 is not subjected to loading and covers the sleeve opening 121. The leaf spring 141 is designed with a curvature which, at one end, runs tangentially to the side surface 136. The ferrule 23 of the plug-in connector 2 is worked in a highly precise manner and is thus very sensitive. For this reason and due to a risk of contamination, for example, by metal abrasion, the ferrule 23 must not come into contact with the leaf spring 141 during the plug-in process. The curvature of the leaf spring 141 thus has to be adapted in accordance with the geometry of the plug-in connector 2. FIG. 6(b) shows the displacement of the leaf spring 141 by a relatively wide termination surface 24 of the plug-in connector 2. A sufficient spacing between the ferrule 2 and the leaf spring 141 is ensured here. Laser-beam emission from the coupling housing 10 in the axial direction on account of the sleeve opening 121 being released is prevented by the plug-in connector 2. FIG. 6(c) shows the end of the plug-in operation. The plug-in connector 2 is accommodated in the coupling 1 by latching means. The leaf spring 141 here has been displaced into the depression of the housing wall by the plug-in connector 2. The very thin configuration of the leaf spring 141 causes it to fit very snugly into the depression of the housing wall. Fitting the cover 14 for protection against the emission of laser radiation thus does not require either plug-in connectors 2 provided to be changed or the size of the coupling housing 10 to be increased.

Figure 7:
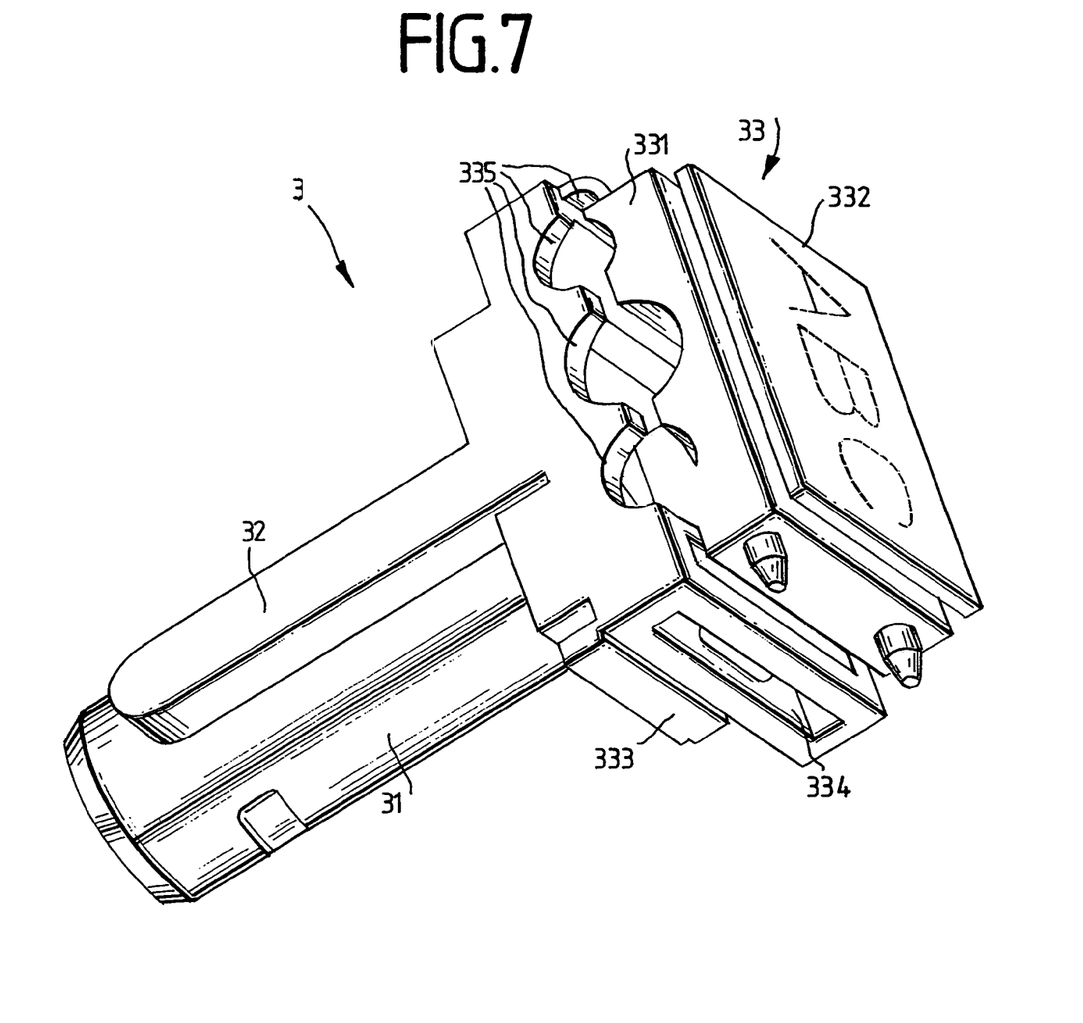
FIG. 7 shows a perspective illustration of a first embodiment of a dust-protection cap.

The protective device described only provides protection against the emission of harmful laser radiation. In most cases, this device does not provide sufficient protection against the penetration of dust and other contaminants into the sleeve 12. For additional dust protection when the plug-in connector 2 is subjected to pulling, use has to be made, for example, of a dust-protection cap 3 illustrated in FIG. 7. The dust-protection cap 3 is designed with a cylinder 31 by means of which the cap can be accommodated by the sleeve mount 11, illustrated in FIG. 2 for example, of the coupling 1. In the case of such a dust-protection configuration, the sleeve 12 is sealed precisely at the critical location. The diameter of the cylinder 31 is only dependent on the geometry of the sleeve mount 11, and is thus not dependent on the use of the connection piece 13. The dust-protection cap 3 can be aligned by a tongue 32. The tongue 32 here engages in the groove 101, illustrated in FIG. 1, of a coupling housing 10 and, if a connection piece 13 is used, also in the groove 131. The length of the tongue 32 here does not have to correspond either to the length of the groove 101 or of the grooves 101 and 131, since no sealing is required there. In addition, it is also conceivable to provide dust protection by a cap which seals over the end sides of the coupling housing 10 and/or of the connection piece 13. The advantage with sealing over the end sides is that the entire coupling interior is protected. In order to ensure that the interior is sealed, the groove 101 or the grooves 101 and 131 has/have to be closed by corresponding tongues on the cap. The configuration of the cap is thus no longer dependent on the configuration of the coupling 1, illustrated in FIG. 1, with or without a connection piece 13. That end of the dust protector 3 which is directed away from the coupling 1 is designed with a fixing means 33. Via the fixing means 33, the withdrawn dust-protection cap 3 can be fastened on a cable of a plug-in connector accommodated by the coupling 1. The fixing means 33 comprises a pivotable cover 331, which is designed with a latching hook 334, and a groove 333, which complements the latching hook 334. The latching hook 334 here may be designed such that different latching positions may be assumed when the cover 331 is closed. The fiber-optic cable can be positioned in one of the bores 335 when the cover 331 has been swung open. The bores 335 have different radii, with the result that the dust-protection cap 3 can be fixed on cables with a wide range of different diameters. The outwardly oriented surface 332 of the cover 331 here provides a good inscription surface, which is easily accessible when the coupling 1 is attached to a front panel.

Figure 8:
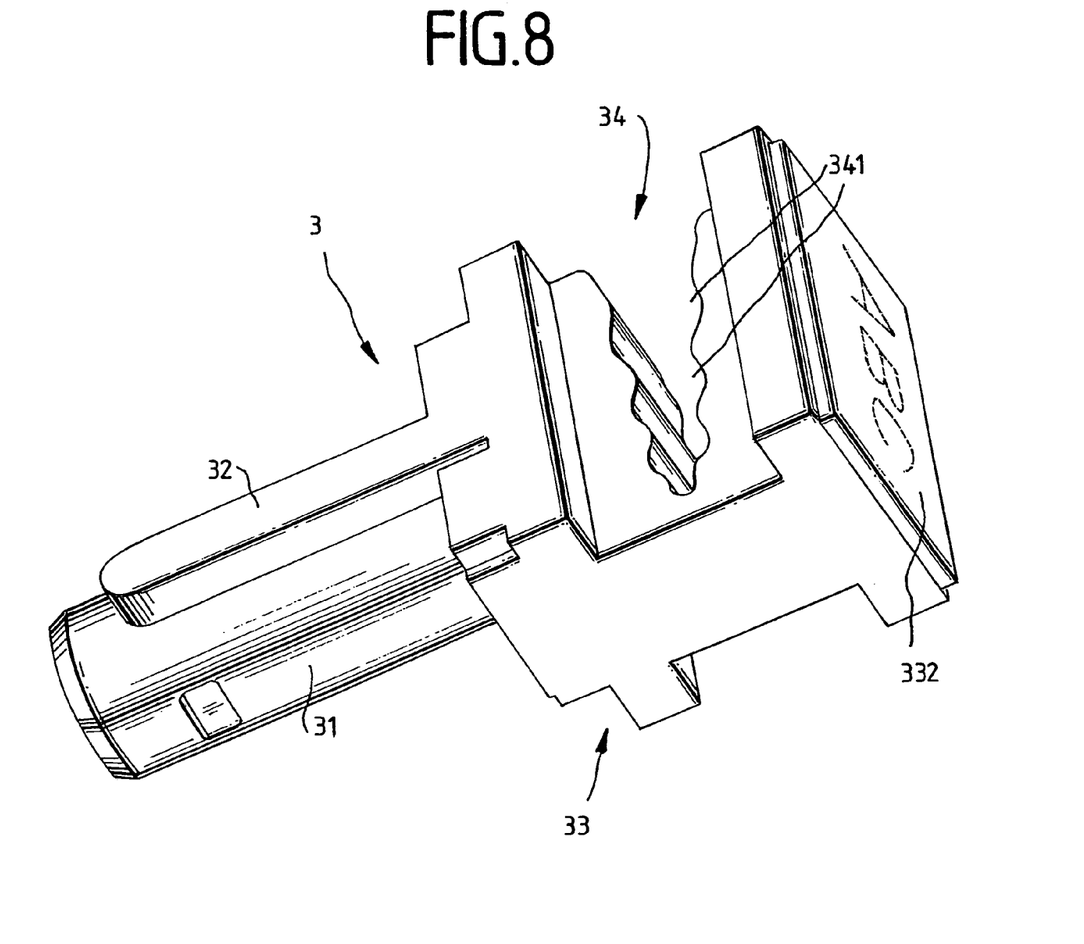
FIG. 8 shows a perspective illustration of a second embodiment of the dust-protection cap.

FIG. 8 shows a second embodiment of a fixing means 33 on the dust-protection cap 3. The designations here correspond to FIG. 7. In the second embodiment, the fixing means 33 is designed with a latching connection 34 into which the fiber-optic cable can be latched. The latching connection 34 has bores 341 of different diameters, with the result that they can be plugged onto a multiplicity of different cable diameters. Also conceivable instead of the bores 341 are sawtooth-like formations, by means of which different cables can be fixed and/or clamped in. If the plug-in direction of the latching connection 34 coincides with the axis of the cylinder 41, a possible inscription surface is dispensed with. However, fixing means which allow the inscription surface to be maintained are to be used in preference. The design of the latching connection 34, with a plug-in direction perpendicular to the axis of the cylinder 31, which is illustrated in FIG. 8 is thus advantageous. This second embodiment of the fixing means 33 can be produced in one piece, and thus cost-effectively. The straightforward latching onto a cable is also advantageous. Further embodiments of the fixing means 33, for example fixing on the coupling housing by a chain or a flexible strap or by latching or plugging onto the coupling housing, are likewise conceivable.

Designing the coupling with a protective device according to the invention and with a dust protector means that, when the plug is subjected to pulling, the coupling is protected against the penetration of contaminants and the environment is protected against the emission of laser radiation. The protective device and the dust protector, however, are not mutually dependent.

LIST OF DESIGNATIONS

1 Coupling
10 Coupling housing
101 Groove
102 Bore
104 Contact surface
105 Latching nose
106 Flange
11 Sleeve mount
12 Sleeve
121 Sleeve opening
13 Connection piece
131 Groove
132 Centering pin
134 Latching tongue
135 Though-passage
136 Side surface
14 Covering
141 Leaf spring
142 Wing
2 Plug-in connector
21 Tongue
22 Grip region
23 Ferrule
24 Termination surface
3 Dust-protection cap
31 Cylinder
32 Tongue
33 Fixing means
331 Cover
332 Inscription surface
333 Groove
334 Latching hook
335 Bore
34 Latching connection
341 Bore

The invention claimed is:

1. A coupling for accommodating at least two plug-in connectors which are connected to fiber-optic cables, comprising:
a coupling housing including a sleeve having a sleeve opening;
a connection piece configured to couple to the coupling housing, the connection piece having an inner surface; and
at least one moveable covering, which is assigned to the sleeve opening, wherein the covering, in a first position, covers the sleeve opening and, by the introduction of a plug-in connector, can be moved into a second position, in which the covering releases the sleeve opening, the covering comprising a bent metallic leaf spring, the leaf spring biased into the first position until subjected to loading,
wherein a ferrule of the plug-in connector does not come into contact with the leaf spring at any point in time as the covering is moved to the second position, and
wherein the covering includes wings that extend from the covering over an inner surface of the connection piece to secure the covering to the connection piece, the covering being planar when the covering is moved into the second position, and
wherein the wings include tabs that are coplanar therewith and that extend toward the coupling housing, and wherein the wings define cutouts between the covering and the tabs such that the tabs are coupled to the covering by reduced width planar extensions.

2. The coupling as claimed in claim 1, further comprising centering pins configured to form a connection between the connection piece and the coupling housing.

3. The coupling as claimed in claim 1, wherein the covering is fastened on the connection piece by hot stamping.

4. The coupling as claimed in claim 1, wherein the connection piece is designed as a plastic part, and the covering can be connected to the connection piece by injection-molding encapsulation.

5. The coupling as claimed in claim 1, wherein the connection piece is fonned from sheet-metal.

6. The coupling as claimed in claim 1, wherein the leaf spring, in the second position, rests in a depression of the housing wall.

7. The coupling as claimed in claim 1, wherein the connection piece includes latching means and can be monnted onto the coupling housing via the latch.

8. The coupling as claimed in claim 7, wherein the latching means of the connection piece includes through-passages in latching tongues and latching means of the coupling housing includes latching noses.

9. A coupling arrangement comprising:
a coupling housing configured to accommodate a first plug-in connector at a first end of the coupling housing and a second plug-in connector at a second, opposite end of the coupling housing, each plug-in connector including a ferrule through which light can be emitted; and
a first connection piece configured to couple to the second end of the coupling housing, the first connection piece having an inner surface from which a first portion of a covering curves upwardly in a first position and along which a second portion of the covering extends from a first distal end to a second distal end to secure the covering to the first connection piece, the second portion of the covering being pianar from the first distal end to the second distal end, the first portion of the covering being moveable from the first position, in which the first portion inhibits light emitted from the first plug-in connector from reaching the second end of the coupling housing, to a second position, in which the first portion of the covering does not inhibit light emitted from the first plug-in connector from reaching the second end of the coupling housing, the second portion of the covering including a first reduced width planar section coupling a first tab to the first portion of the covering, the first tab extending coplanar with the second portion from the first distal end of the second portion toward the coupling housing, and the second portion of the covering including a second reduced width planar section coupling a second tab to the first portion of the covering, the second tab extending coplanar with the second portion from the second distal end of the second portion toward the coupling housing;
wherein the covering moves from the first position to the second position by insertion of the second plug-in connector at the second end of the coupling housing, and
wherein a ferrule of the second plug-in connector does not contact the first portion of the covering when the second plug-in connector is inserted.

10. The coupling arrangement of claim 9, wherein the covering, in the second position, rests within a depression in an inner surface of the coupling housing.

11. The coupling arrangement of claim 9, further comprising: a second connection piece configured to couple to the first end of the coupling housing, the second connection piece having an inner wall;
a second covering curving upwardly from the inner surface of the second connection piece, the second covering being moveable from a first position, in which the second covering inhibits light emitted from the ferrule of the second plug-in connector from reaching the first end of the coupling housing, to a second position, in which the second covering does not inhibit light emitted from the ferrule of the second plug-in connector from reaching the first end of the coupling housing.

12. The coupling arrangement of claim 9, wherein the covering comprises a metallic leaf spring.

13. A connection piece for coupling to a coupling housing, the coupling housing configured to accommodate a first plug-in connector at a first end of the coupling housing and to accommodate a second plug-in connector at a second, opposite end of the coupling housing, the connection piece comprising:
a body including two spaced-apart sides interconnected by a base, the base having an inner surface and an opposite outer surface, the body defining an open front and an open rear, the open rear of the body being configured to couple to a first end of the coupling housing;
a covering coupled to the body, a first portion of the covering extending along the inner surface of the base between the two spaced-apart sides of the body, and a second portion of the covering curving upwardly from the inner surface of the base and towards the open rear, the second portion, when in a first position, being configured to inhibit light emitted from the second plug-in connector from exiting the adapter, wherein inserting the first plug-in connector moves the covering to a second position enabling optical communication between the second plug-in connector and the first plug-in connector; and
first and second wings coupled to the inner surface of the body, the first and second wings being coplanar with the first portion of the covering, the first wing extending from the first portion of the covering along the inner surface of the body to a first of the spaced-apart sides, the second wing extending from the first portion of the covering along the inner surface of the body to a second of the spaced apart sides, the first and second wings including tabs projecting along the inner surface of the body towards the open rear of the body, the tabs being coplanar with the first portion of the covering, the first and second wings defining cutouts between the tabs and the first portion of the covering.

14. The connection piece of claim 13, wherein the body is formed from plastic, and the covering couples to the body through injection-molding encapsulation.

15. The connection piece of claim 13, wherein the covering is coupled to the body by hot stamping.

16. The connection piece of claim 13, wherein the covering comprises a metallic leaf spring.

17. The connection piece of claim 13, wherein the covering is formed integrally with the body.

18. The connection piece of claim 13, wherein the connection piece is formed from sheet-metal.

* * * * *

UNITED STATES PATENT AND TRADEMARK OFFICE
CERTIFICATE OF CORRECTION

PATENT NO. : 7,470,068 B2 Page 1 of 1
APPLICATION NO. : 10/513243
DATED : December 30, 2008
INVENTOR(S) : Kahle et al.

It is certified that error appears in the above-identified patent and that said Letters Patent is hereby corrected as shown below:

Col. 7, line 24, claim 9: "being pianar from the" should read --being planar from the--

Signed and Sealed this

Thirtieth Day of June, 2009

JOHN DOLL
*Acting Director of the United States Patent and Trademark Office*